United States Patent [19]  
Nakao et al.

[11] Patent Number: 4,842,768  
[45] Date of Patent: Jun. 27, 1989

[54] ELECTRICALLY CONDUCTIVE ADHESIVE

[75] Inventors: Kozo Nakao; Susumu Hirokawa, both of Niigata, Japan

[73] Assignee: Kyowa Gas Chemical Industry Co., Ltd., Tokyo, Japan

[21] Appl. No.: 819,146

[22] Filed: Jan. 15, 1986

[30] Foreign Application Priority Data

Jan. 16, 1985 [JP] Japan .................................. 60-5488

[51] Int. Cl.$^4$ ............................................. H01B 1/00  
[52] U.S. Cl. ..................................... 252/500; 128/640  
[58] Field of Search ................ 252/500; 128/640, 641, 128/802; 526/279

[56] References Cited  
U.S. PATENT DOCUMENTS 3,998,215 12/1976 Anderson et al. .  
4,273,135 6/1981 Larimore et al. .

FOREIGN PATENT DOCUMENTS 0012402 6/1980 European Pat. Off. .  
8102097 6/1981 European Pat. Off. .  
2464078 3/1981 France .  
2935238 3/1981 German Democratic Rep. .  
5636940 9/1979 Japan .

Primary Examiner—Josephine Barr  
Attorney, Agent, or Firm—Gordon W. Hueschen

[57] ABSTRACT

An electrically conductive adhesive, formed by polymerizing and cross-linking (a) a radically polymerizable ionic unsaturated monomer soluble in a mixture of a water-soluble polyhydric alcohol with water, (b) a trialkoxysilylalkyl (meth)acrylate represented by the general formula I:

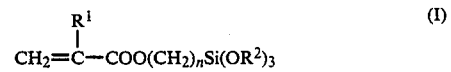

wherein $R^1$ denotes hydrogen atom or methyl group, $R^2$ an alkyl group of 1 or 2 carbon atoms, and n an integer of the value of 2 or 3, and (c) a (meth)acrylate represented by the general formula II:

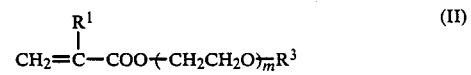

wherein $R^1$ denotes the same meaning as defined above, $R^3$ hydrogen atom or an alkyl group of 1 to 4 carbon atoms, and m an integer of the value of 1 to 23, in the presence of (d) a water-soluble polyhydric alcohol and (e) water.

10 Claims, 1 Drawing Sheet

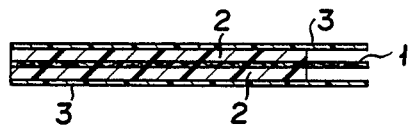
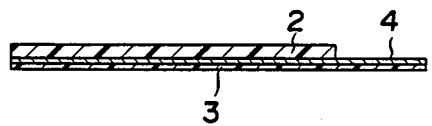
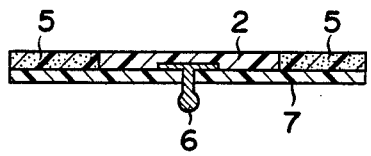
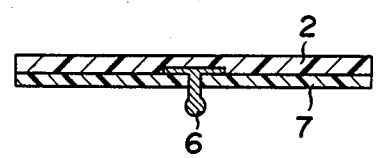
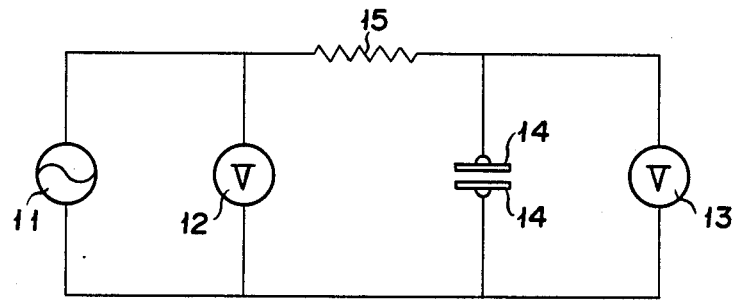

ELECTRICALLY CONDUCTIVE ADHESIVE

BACKGROUND OF THE INVENTION

1. Field of the Invention

This invention relates to an electrically conductive adhesive, a method for the manufacture thereof, and a bio-medical electrode using the electrically conductive adhesive as an essential component thereof.

2. Description of Prior Art

The electrode to be used for the living body has been known in the the field of clinical medicine. Generally, the electrode of this class is provided with an electrically conductive material such as a metallic plate having a conductive wire connected thereto. This wire is connected to a therapeutic apparatus or to a medical measuring instrument. At times, an electrically conductive paste, cream, or gel is applied to the skin of a patient for the purpose of improving electric connection between the skin of the patient and the electrically conductive material such as an electrode. The electrically conductive paste, cream, or gel which has been used to date for this purpose is slimy and offensive. This practice of using such material entails the troublesome chore of removing the material after use by wiping. There are persons who receive unpleasant stimulus from the wiping action.

To improve the situation, the so-called dry-type electrode using an electrically conductive adhesive as its basic component has been developed. In this dry electrode, the electrically conductive adhesive serves the purpose of enhancing the conductivity of electricity between the skin and the electrode and ensuring adhesion of the electrode to the skin. One known version of this dry electrode utilizes an adhesive agent incorporating therein an electrically conductive filler formed of particles of metal or metal salt. This version has a problem concerning the ability to transmit electric signals.

Another known version of the dry electrode makes use of a natural polymer such as karaya rubber. The natural polymer is liable to be affected by such factors as origin and weather conditions and it does not easily acquire a constant quality owing to variability of its content of impurities. In the circumstance, studies have been under way in search of an electrically conductive synthetic polymer suitable for an adhesive agent in the dry electrode. As synthetic polymers of this nature, there have been proposed an adhesive incorporating therein a cohesive synthetic hydrophilic polymer containing at least 5 mol % of a carboxylate monomer unit, lacking a stimulating property, and enjoying high adaptability (U.S. Pat. No. 4,273,135), an adhesive agent formed of a water-soluble monomer, a nonionic water-soluble interpolymer of a water-soluble monomer with a water-insoluble monomer, or a nonionic water-insoluble interpolymer of a water-soluble monomer with a water-insoluble monomer containing at least 15% of water-soluble monomer (Japanese Patent Laid-open No. SHO 56(1981)-36,940), and an electrically conductive adhesive obtained by radically polymerizing a water-soluble polyhydric alcohol, an unsaturated carboxylate soluble in the polyhydric alcohol, and a radically polymerizable polyfunctional unsaturated monomer (WO81/02097).

The disadvantage constitutes one of the reasons for the persistent demand for a dry electrode. In consequence of the diversification of the manner of use, there are times when the polymer is left standing in a state randomly taken out of its package. In this case, there is the possibility that the aging has its adverse effects manifested upon various essential properties of the polymer such as coming into fast adhesion to the patient's skin under a slight pressure, resisting separation from the skin due to the patient's perspiration or movement, having adequate softness for adhering closely with the skin of the patient despite a complicated shape without a gap, and not tending to leave any residue of the adhesive agent behind on the patient's skin after use. There are times when it becomes necessary for the polymer taken out of its package to be provisionally coated on its surface with a film for the purpose of preservation of cleanliness. Incidentally, the dry electrode utilizing the polymer requires for its packaging the use of a film which has been treated with a peeling agent. None of the electrodes so far developed is readily applied to and separated from the conventional film which has not been given the aforementioned treatment.

An object of this invention, therefore, is to provide a novel electrically conductive adhesive and a method for the manufacture thereof.

Another object of this invention is to provide a bio-medical electrode using the novel electrically conductive adhesive as its essential component.

SUMMARY OF THE INVENTION

The objects described above are accomplished by an electrically conductive adhesive which is formed by polymerizing and cross-linking (a) a radically polymerizable ionic unsaturated monomer soluble in a mixture of a water-soluble polyhydric alcohol with water, (b) a trialkoxysilylalkyl (meth)acrylate, represented by the general formula I:

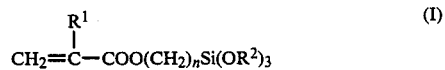
(I)

wherein $R^1$ stands for hydrogen atom or methyl group, $R^2$ for an alkyl group of 1 or 2 carbon atoms, and n for an integer of the value of 2 or 3, and (c) a (meth)acrylate represented by the general formula II:

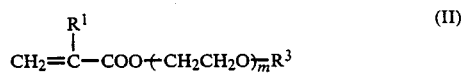
(II)

wherein $R^1$ stands for the same meaning as defined above, $R^3$ for hydrogen atom or an alkyl group of 1 to 4 carbon atoms, and m for an integer of the value of 1 to 23, in the presence of (d) a water-soluble polyhydric alcohol and (e) water.

The objects described above are also accomplished by a method for the manufacture of an electrically conductive adhesive, which comprises polymerizing and cross-linking (a) a radically polymerizable ionic unsaturated monomer soluble in a mixture of a water-soluble polyhydric alcohol with water, (b) a trialkoxysilylalkyl (meth)acrylate represented by the general formula I, and (c) a (meth)acrylate represented by the general formula II in the presence of (d) a water-soluble polyhydric alcohol, (e) water, and (f) a polymerization initiator soluble in the mixture of the water-soluble polyhydric alcohol with water.

Further, the aforementioned objects are accomplished by a bio-medical electrode using the aforementioned electrically conductive adhesive as an essential component thereof.

BRIEF DESCRIPTION OF THE DRAWINGS

FIGS. 1–4 are cross sections illustrating typical bio-medical electrode embodying the present invention, and FIG. 5 is a circuit diagram for measurement of the electrode pair impedance of the bio-medical electrode embodying this invention.

EXPLANATION OF THE PREFERRED EMBODIMENT

Examples of the water-soluble polyhydric alcohol to be used in this invention include ethylene glycol, diethylene glycol, triethylene glycol, propylene glycol, trimethylene glycol, dipropylene glycol, 1,2-butanediol, 1,3-butanediol, 1,4-butanediol, 1,5-pentanediol, hexanediol, neopentyl glycol, dibromoneopentyl glycol, trimethylpentanediol, trimethylol ethane, trimethylol propane, pentaerythritol, dipentaerythritol, glycerol, diglycerol and sorbitol. Among other polyhydric alcohols enumerated above, glycerol proves particularly desirable. The amount of the water-soluble polyhydric alcohol to be used is in the range of 10 to 80% by weight, preferably 30 to 70% by weight, based on the total amount of the reactants used.

The amount of water to be used in combination with the water-soluble polyhydric alcohol is in the range of 5 to 40% by weight, preferably 10 to 30% by weight. Optionally, this water may be used in conjunction with such an electrolyte as sodium chloride, potassium chloride, lithium chloride, ammonium chloride, calcium chloride, or magnesium chloride. The amount of the electrolyte so used is in the range of 0.5 to 20% by weight, preferably 3 to 15% by weight, based on the amount of water.

The ionic monomer to be used in the present invention is required to be soluble in the mixture of the aforementioned water-soluble polyhydric alcohol with water. Preferably, it is an anionic monomer. The amount of the ionic monomer to be used is in the range of 10 to 40% by weight, preferably 7 to 30% by weight, based on the amount of the reactants used. Desirable examples of the ionic monomer are unsaturated organic carboxylic acids such as acrylic acid, methacrylic acid, maleic acid, itacomic acid, and citraconic acid and salts thereof, preferably acrylic acid and methacrylic acid and salts thereof, unsaturated organic sulfonic acids such as styrene sulfonic acid, methallyl sulfonic acid, 2-sulfoethyl acrylate, 2-sulfoethyl methacrylate, 3-sulfopropyl acrylate, 3-sulfopropyl methacrylate, acrylamide-2-methylpropane sulfonic acid and salts thereof, and other radically polymerizable ionic monomers containing a carbon-carbon double bond, preferably sulfonic acid derivatives. Among the ionic monomers enumerated above, particularly desirable selections are 3-sulfopropylacrylate or methacrylate, salts thereof, 2-acrylamide-2-methyl propane sulfonic acid, and salts thereof. Example of the cation involved in the formation of such salts include sodium, potassium, lithium, and ammonium ions. These ionic monomers may be used singly or in the form of a mixture of two or more members.

Typical examples of the trialkoxysilylalkyl (meth)acrylate, represented by the general formula I:

wherein $R^1$ stands for hydrogen atom or methyl group, $R^2$ for an alkyl group of 1 or 2 carbon atoms, and n for an integer of the value of 2 or 3, include 2-trimethoxysilylethyl acrylate, 2-trimethoxysilylethyl methacrylate, 2-triethoxysilylethyl acrylate, 2-triethoxysilylethyl methacrylate, 3-trimethoxysilylpropyl acrylate, 3-trimethoxysilylpropyl methacrylate, 3-triethoxysilylpropyl acrylate, and 3-triethoxysilyl-propyl methacrylate. Among the examples cited above, 3-trimethoxysilylpropyl (meth)acrylates and 3-triethoxysilylpropyl (meth)acrylates are particularly desirable selections. These trialkoxysilylalkyl (meth)acrylates are used either singly or in the form of a mixture of two or more members. The amount of (meth)acrylate to be used is in the range of 0.05 to 1% by weight, preferably 0.1 to 0.5% by weight, based on the total amount of the reactants used.

Typical examples of (meth)acrylate represented by the general formula II:

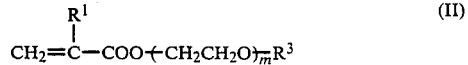

wherein $R^1$ stands for the same meaning as defined above, preferably methyl group, $R^3$ for hydrogen atom or an alkyl group of 1 to 4, preferably 1 to 2, carbon atoms, and m for an integer of the value of 1 to 23, preferably 1 to 9, include, 2-hydroxyethyl acrylate, 2-hydroxyethyl methacrylate, methoxyethyl acrylate, methoxyethyl methacrylate, ethoxyethyl (meth)acrylate, propoxyethyl (meth)acrylate, butoxyethyl (meth)acrylate, diethylene glycol mono(meth)acrylate, methoxydiethylene glycol mono(meth)acrylate, methoxytriethylene glycol mono(meth)acrylate, ethoxytriethylene glycol mono(meth)acrylate, methoxynonaethylene glycol mono(meth)acrylate, and methoxypolyethylene glycol mono(meth)acrylate. Among the (meth)acrylates cited above, 2-hydroxyethyl (meth)acrylate, methoxytriethylene glycol monoacrylate, and methoxynonaethylene glycol monoacrylate prove particularly desirable, and 2-hydroxyethyl methacrylate is most desirable. These (meth)acrylates are used either singly or in the form of a mixture of two or more members. The amount of a (meth)acrylate to be used is in the range of 2 to 30% by weight, preferably 5 to 20% by weight, based on the total amount of the reactants used.

The electrically conductive adhesive of the present invention is manufactured by any of the conventional methods available for radical polymerization such as a method which comprises mixing the aforementioned monomers, the polyhydric alcohol, and water in a prescribed ratio and heating the mixture which comprises preparing the same mixture and irradiating the mixture with light, preferably ultraviolet light, in the presence of a photopolymerization initiator, or a method combining the two methods, described above. In the methods cited, the method which irradiates the mixture with light, particularly ultraviolet light, in the presence of a photopolymerization initiator proves desirable because the irradiation serves to promote the phenomenon of cross-linking.

Examples of the thermal polymerization initiator include azobisisobutylonitrile, benzoyl peroxide, lauroyl peroxide, methylethyl ketone peroxide, lauroyl peroxide, cyclohexane peroxide, t-butylhydroperoxide, di-t-butyl peroxide di-t-amyl peroxide, dicumyl peroxide, and t-butyl perbenzoate. The amount of the thermal polymerization initiator to be used is generally in the range of 0.05 to 1% by weight, preferably 0.1 to 0.5% by weight, based on the total amount of the monomers used. The heating temperature is in the range of 50° to 90° C., preferably 60° to 80° C. The heating time is in the range of 0.5 to 6 hours, preferably 1 to 3 hours.

Examples of the photopolymerization initiator include benzoin alkyl ethers such as benzoin, benzoin isopropyl ether, and benzoin isobutyl ether; benzophenones such as benzophenone, and methyl-o-benzoyl benzoate; acetophenones such as acetophenone, trichloroacetophenone, 2,2-diethoxyacetophenone, p-t-butyltrichloro-acetophenone, 2,2-dimethoxy-2-phenylacetophenone, and p-dimethylaminoacetophenone; thioxanthones such as xanthone, thioxanthone, 2-chlorothioxanthone, and 2-isopropyl thioxanthone; benzyl 2-ethyl anthraquinone, methylbenzoyl formate, 2-hydroxy-2-methyl-1-phenyl propane-1-one, 2-hydroxy-4'-isopropyl-2-methyl propiophenone, 1-hydroxycyclohexyl phenyl ketone, tetramethyl thiuram monosulfide, and allyl diazonium salt. The amount of the photopolymerization initiator to be used is generally in the range of 0.05 to 1% by weight, preferably 0.1 to 0.5% by weight, based on the total amount of the monomers used. As to the dosage of the ultraviolet light, irradiation with the light from a ultraviolet lamp (chemical lamp) having 6W of power output (1.2 m of tube length) separated by a distance of 15 cm, for example, is continued for a duration of 2 to 60 minutes, preferably 4 to 20 minutes. The mixture to be polymerized may incorporate therein a sensitizer such as an amine compound, a sulfur compound, or a phosphorus compound when necessary.

The adhesive of the present invention may be produced by being polymerized on a substrate destined to form an electrode. Alternatively, it may be produced applying a partially polymerized precursor on a substrate and then continuing polymerization until completion. Further, it may be produced by polymerizing on a material capable of peeling which does not constitute the electrode such as a film, a plate, etc., or between these materials.

The adhesive may further incorporate therein such tackifier as garaya rubber in a proportion incapable of impairing the objects of this invention.

Manufacture of the electrically conductive adhesive of the present invention can be accomplished by adopting a method which comprises blending a mixture of component monomers, solvent, etc. with a polymerization initiator, and simultaneously effecting polymerization and cross-linking of the resultant blend.

The method of the invention has the advantage that it permits the gelled adhesive of a desired shape to be produced through one step of operation from the raw material of low viscosity. It is useful particularly because the composition involved in this invention is enabled to undergo polymerization and cross-linking simultaneouly owing to use of a photopolymerization initiator and irradiation with the ultraviolet light.

The electrically conductive adhesive obtained as described above can be used in a varying construction as a bio-medical electrode. The bio-medical electrode can assume a varying construction to suit the particular purpose of use so long as the construction has the electrically conductive adhesive as the essential component. For example, the bio-medical electrode illustrated in FIG. 1 comprises an electrically conductive adhesive layer 2 incorporating therein a reinforcing material 1 such as of woven fabric like tricot or a non-woven fabric and a protective film 3 such as of polyethylene terephthalate, polyethylene, or polypropylene covering the opposite sides of the electrically conductive layer 2. At the time of actual use, the bio-medical electrode is stripped of the protective film 2, attached on one side thereof to the subject under test (such as the human body), and connected on the other side thereof to a measuring instrument.

FIG. 2 illustrates another typical bio-medical electrode embodying this invention. It comprises an electrically conductive adhesive layer 2, an electrode 4 of metal foil superposed on the surface of the electrically conductive adhesive layer 2, and a protective film 3 covering the surface of the electrode 4. At the time of actual use, the electrode 4 is connected to a measuring instrument and, at the same time, the remaining surface of the electrically conductive adhesive layer 2 is held in contact with the subject under test.

FIG. 3 illustrates yet another typical bio-medical electrode embodying this invention. It comprises a support member 7 (circular in shape, for example) made of a plastic substance, an electrode 6 incorporated in the support 7 in such a manner as to protrude from both sides thereof, and electrically conductive adhesive layer 2 (circular in shape, for example) superposed on one side of the support 7 thick enough to conceal the portion of the electrode 6 which portrudes from the same side of the support 7, and a sponge layer 5 formed along the boundary of the electrically conductive adhesive layer 2. At the time of actual use, the electrode 6 is connected to a measuring instrument and the electrically conductive adhesive layer 2 is pressed against the subject under test. In this case, since the sponge layer 5 is readily deformed by pressure so as to seal a space between the electrically conductive gel and exterior atmosphere, it plays a part to prevent the change of electrical properties by invasion of sterilizing solution.

FIG. 4 illustrates a further typical bio-medical electrode embodying the present invention. This equals the bio-medical electrode of FIG. 3, except that the sponge layer 5 is omitted and the electrically conductive adhesive layer 7 is enlarged to fill the part left behind by the omission.

Now, the present invention will be described more specifically below with reference to working examples. Wherever parts and percents are mentioned in the working examples, they are meant as parts and percents by weight unless otherwise specified.

EXAMPLE 1

In 1,000 parts of [α-methoxytri(oxyethylene)-yl]acrylate, 10 parts of 1-hydroxycyclohexyl phenyl ketone (product of Ciba Geigy and marketed under trademark designation of Irgacure 184) was dissolved. In the resultant solution, 40 parts of 3-trimethoxysilylpropyl methacrylate was dissolved. (This solution is designated as Solution A.). Separately, 3,000 parts of potassium salt of sulfopropyl methacrylate was dissolved by heating in 2,000 parts of an aqueous 5% sodium chloride solution. (This solution is designated as Solution B.) A homogeneous solution was obtained by dissolving 5,600 parts of glycerol, 4,400 parts of Solution B, and 44 parts of acrylic acid in 1.050 parts of Solution A and deaerating the resultant solution. On a polyester film 100 μm in thickness held horizontally and provided thereon with a frame adapted to keep a liquid therein, the homogeneous solution was cast in a thickness of 1 mm. The solution holding the polyester film was kept under an atmosphere of nitrogen and irradiated for 5 minutes with the ultraviolet light emitted from two parallely disposed 30 W chemical lamps (63 cm in bulb length) (product of Toshiba and marketed under product code FL30SBL) kept at a distance of 15 cm from the solution under treatment. Consequently, there was obtained a water-containing gel possessing viscosity proper to the skin and sufficient cohesive force to avoid being torn on separation from the polyester film or separation from the skin. When this gel was left standing in the air, it showed substantially no increase or decrease of weight.

An electric circuit of configuration shown in FIG. 5 was obtained by cutting two squares of 3 cm from the gel obtained as described above, joining the two gel squares 14 and 14 face to face, and nipping the joined squares with nickel silver plates. An alternating current of 10 Hz was generated by an oscillator 11 and potential differences $V_1$ and $V_2$ were measured with voltage testers 12 and 13. By calculation, the electrode pair impedance was found to be 400 Ω. Even after elapse of 24 hours, the value was 500 Ω. When the same pair of electrodes was attached, one each to the wrists of a human subject, they registered an impedance of 20K Ω. In the diagram, the numerical symbol 15 denotes a resistance.

EXAMPLE 2

A solution was prepared by following the procedure of Example 1, except that [α-methoxynona(oxyethylene) ω-yl]acrylate was used in the place of [α-methoxytri(oxyethylene)ω-yl] acrylate. On the same polyester film provided thereon with a frame as used in Example 1, a nonwoven fabric of nylon 10 g in unit weight was mounted and the solution was poured thereon in a thickness of about 1.5 mm. In the same apparatus as used in Example 1, the solution on the film was irradiated with the ultraviolet light for 5 minutes in an atmosphere of nitrogen. The water-containing gel so obtained possessed satisfactory viscosity and cohesiveness.

The electrode pair impedance measured similarly to Example 1 was 600 Ω and the impedance measured through a human body was 30K Ω.

EXAMPLE 3

A solution was obtained by following the procedure of Example 1, except that potassium salt of 2-acrylamide-2-methylpropane sulfonic acid was used in the place of potassium salt of sulfopropyl methacrylate. On the polyester film, a knit fabric of polyester (75 denier) was maintained at a height of 1 mm and the solution was poured thereon in a thickness of about 2 mm. Consequently, there was obtained a water-containing gel incorporating therein the knit fabric of polyester.

The electrode pair impedance measured similarly to Example 1 was 900 Ω and the impedance measured through a human body was 40K Ω.

EXAMPLE 4

A water-containing gel similar to the gel of Example 3 was obtained by following the procedure of Example 1, except that potassium methacrylate was used in the place of potassium salt of sulfopropyl methacrylate and 3-triethoxysilylpropyl methacrylate was used in the place of 3-trimethoxysilylpropyl methacrylate.

The electrode pair impedance measured similarly to Example 1 was 1K Ω and the impedance measured through a human body was 40K Ω.

EXAMPLE 5

In 1,600 parts of 2-hydroxyethyl methacrylate, 10 parts of [α-methoxytri(oxyethylene)-yl]acrylate was dissolved, and then 40 parts of 3-trimethoxysilylpropyl methacrylate was dissolved in the resultant solution. In the resultant solution, 4,000 parts of Solution B of Example 1 and 5,600 parts of glycerol were dissolved and deaerated to obtain a homogeneous solution. The solution was poured into space 2 of a constitution shown in FIG. 3 (numerical symbols-5 and 7 are foamed polybutadiene having independent cells, numerical 6 is a metallic foil treated with silver-silver chloride on the surface, the polybutadiene 5 and 7 is 42 mm in outer diameter and 1 mm in thickness, 25 mm in inner diameter, and the surface of the polybutadiene 5 is treated with the adhesive), and was irradiated by ultraviolet light in a nitrogen atmosphere by a similar manner to Example 1. The two electrode thus obtained were superposed and electrodes pair impedance was measured to obtain 300 Ω at 10 Hz.

EXAMPLE 6

In a mixed solution of 200 parts of 2-hydroxyethyl acrylate with 1,000 parts of [α-methoxynona(oxyethylene)ω-yl]acrylate, 10 parts of benzoin ethyl ether was dissolved. To the resultant solution, 40 parts of 3-trimethoxysilylpropyl methacrylate was added. The solution so produced is designated as solution A.

In 2,500 parts of an aqueous 3% sodium chloride solution, 2,500 parts of potassium salt of 3-sulfopropyl acrylate was dissolved. The solution so produced is designated as solution B. The solution designated as a homogeneous solution was obtained by mixing 1,250 parts of solution A, 4,800 parts of solution B, 6,400 parts of glycerin, and 32 parts of acrylic acid. On a tin foil, this homogeneous solution was cast in a thickness of 1 mm and irradiated for 30 minutes with the untraviolet light from chemical lamps. Consequently, there was obtained a water-containing gel adhering to the tin foil. The gel adhered fast to the tin foil.

For measurement of impedance, the gel as deposited fast on the tin foil was cut to obtain two squares of 3 cm and lead wires were connected to the tin foils to complete a circuit similar to the circuit of Example 1. The electrode pair impedance was 400 Ω and the impedance measured through a human body was 20K Ω.

What is claimed is:

1. An electrically conductive adhesive, formed by polymerizing and cross-linking
   (a) a radically polymerizable ionic unsaturated monomer soluble in a mixture of a water-soluble polyhydric alcohol with water,
   (b) A trialkoxysilylalkyl (meth)acrylate represented by the general formula I:

wherein $R^1$ denotes a hydrogen atom or a methyl group, $R^2$ an alkyl group of 1 or 2 carbon atoms, and n an integer of the value of 2 or 3, and (c) a (meth)acrylate represented by the general formula II:

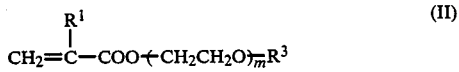

$$CH_2=\overset{R^1}{\underset{|}{C}}-COO(CH_2CH_2O)_{\overline{m}}R^3 \qquad (II)$$

wherein $R^1$ denotes the same meaning as defined above, $R^3$ a hydrogen atom or an alkyl group of 1 or 4 carbon atoms, and m an integer of the value of 1 to 23, in the presence of (d) a water-soluble polyhydric alcohol and
(e) water;

wherein the amount of (a) said radically polymerizable ionic unsaturated monomer is in the range of 10 to 40% by weight, that of (b) said trialkoxysilylalkyl (meth)acrylate of said general formula I in the range of 0.05 to 1% by weight, that of (c) said (meth)acrylate of said general formula II in the range of 2 to 30% by weight, that of (d) said water-soluble polyhydric alcohol in the range of 10 to 80% by weight, and that of (e) said water in the range of 5 to 40% by weight based on the total amounts; and wherein said radically polymerizable ionic unsaturated monomer is at least one member selected from the group consisting of unsaturated organic carboxylic acids, unsaturated organic sulfonic acids, and salts thereof.

2. An electrically conductive adhesive according to claim 1, wherein said radically polymerizable ionic unsaturated monomer is at least one member selected from the group consisting of unsaturated organic sulfonic acids and salts thereof.

3. An electrically conductive adhesive according to claim 2, wherein said organic sulfonic acid or a salt thereof is 3-sulfopropyl(meth)acrylate or 2-acrylamide-2-methylpropane sulfonic acid or a salt thereof.

4. An electrically conductive adhesive according to claim 1, wherein n in said general formula I is 3.

5. An electrically conductive adhesive according to claim 1, wherein $R^3$ in said general formula II is hydrogen or an alkyl group of 1 to 2 carbon atoms and m in the same general formula is an integer of the value of 1 to 9.

6. An electrically conductive adhesive according to claim 5, wherein $R^1$ in said general formula II is hydrogen.

7. An electrically conductive adhesive according to claim 5, wherein $R^1$ in said general formula II is a methyl group.

8. An electrically conductive adhesive according to claim 5, wherein the compound of said general formula II is 2-hydroxyethyl methacrylate.

9. An electrically conductive adhesive according to claim 1, wherein said water-soluble polyhydric alcohol is glycerol.

10. An electrically conductive adhesive according to claim 1, wherein the amount of (a) said radically polymerizable ionic unsaturated monomer is in the range of 15 to 30% by weight, that of (b) said trialkoxysilylalkyl(meth)acrylate of said general formula I in the range of 0.1 to 0.05% by weight based on the total amount of the monomeric reactants, that of (c) said (meth)acrylate of said general formula II in the range of 5 to 20% by weight based on the total amount of the monomeric reactants, that of (d) said water-soluble polyhydric alcohol in the range of 30 to 70% by weight, and that of (e) said water in the range of 7 to 30% by weight.

* * * * *